United States Patent [19]
Herger et al.

[11] 3,889,236
[45] June 10, 1975

[54] INTERFACE SYSTEM WITH TWO CONNECTING LINES

[75] Inventors: Horst Herger; Helmut Hasso Schulz, both of Bremen, Germany

[73] Assignee: U.S. Philips Corporation, New York, N.Y.

[22] Filed: Oct. 9, 1973

[21] Appl. No.: 404,343

[30] Foreign Application Priority Data

Oct. 11, 1972 Germany .......... 2249725
Oct. 11, 1972 Germany .......... 2249737

[52] U.S. Cl. .......... 340/172.5
[51] Int. Cl. .......... G06f 3/04
[58] Field of Search ...... 340/172.5; 179/2, 7, 15 DP

[56] References Cited

UNITED STATES PATENTS

| | | | |
|---|---|---|---|
| 3,399,387 | 8/1968 | Kunze | 340/172.5 |
| 3,581,286 | 5/1971 | Beausoleil | 340/172.5 |
| 3,673,576 | 6/1972 | Donaldson, Jr. | 340/172.5 |
| 3,680,054 | 7/1972 | Bunker et al. | 340/172.5 |
| 3,737,861 | 6/1973 | O'Neill et al. | 340/172.5 |

*Primary Examiner*—Gareth D. Shaw
*Assistant Examiner*—John P. Vandenburg
*Attorney, Agent, or Firm*—Frank R. Trifari

[57] ABSTRACT

In various locations in computer systems or data transmission systems, the number of transmission or transport lines are reduced by the use of a serially operating interface adapter. The adapter which uses a special modulator and demodulator and associated coding technique, simplifies the information transferred over a transport line. The modulator includes means for generating bit pairs having an even and odd state and having the pairs of signal elements being of alternating parity. This arrangement enables a simplified approach for determining the start and the end of a message without the use of additional characters not present in the code set. The adapter also includes a demodulator which is adapted to recover and detect four-bit-parity code signals for recovering start and stop signals of block information.

7 Claims, 10 Drawing Figures

INTERFACE SYSTEM WITH TWO CONNECTING LINES

The invention relates to a serially operating interface adapter for data input and output apparatus, comprising a modulator, a demodulator and a transport line via which blocks of information and clock signals can be transported, furthermore comprising a control unit which is connected to the transport line and which generates connect command signals and receives status signals. An adapter of this kind can be used at various locations in a computer configuration or in a data transmission system. The connection costs of an interface adapter are mainly determined by the number of connecting lines. In the case of long connections, the cable costs are decisive. In the case of short connections, it is an important aspect that each line must be connected by way of a plug or terminal connection on both ends. Connections of this kind are labour-intensive and are subject to repairs. Furthermore, suitable circuits must always be present for the adaptation to the lines. Finally, if the connection terminates in an integrated circuit, the number of connection pins thereof restricts the feasible number of lines. Therefore, the invention has for its object to limit the number of lines required.

Serial transmission of information is also known, for example, on the basis of an ISO seven-bit code. In this respect, the invention has for its object to provide a serially-operating interface adapter for code-transparent transmission. The basic problem in this respect is the detection of the end of a message. It is known that this can be done by means of a character which is not present in the code set, for example, by insertion of special bits in the information flow. However, in that case it is not possible to connect an information source which exclusively supplies an isochronous bit flow. This is the case, for example, with magnetic tape cassettes, disc stores, electrostatic printers and circulating delay lines which are used as a buffer.

Furthermore, the synchronous information transmission involves a fixed transport rate which cannot be influenced.

It is known that this adaptation can be realized for asynchronous transmission, However, because according to these methods, control information must each time be transmitted between the individual information characters, isochronous information traffic is possible only on a character basis, i.e., at a bit transport rate which is higher than necessary for the transmission of the information.

The necessary transmission rate becomes increasingly higher for the presently available peripheral equipment. This is particularly applicable to disc stores, even those of simple design. Consequently, an economic, serially operating interface adapter must ensure that the capacity of the transmission channel is fully utilized, i.e., without redundancy in the transmission of information.

It is particularly advantageous if the transmission rate can also be determined by the naturel frequency of the information receiver. These problems are solved in that the invention is characterized in that the transport line comprises a pair of lines which consists of a clock line and an information line, a bit pair generator being provided which has an even state and an odd state, which is connected to clock inputs and information inputs, which is activated under the control of a block start signal, which is switchable between said states under the control of clock signals, and which generates pairs of signal elements of alternating parity on a clock line and an information line, the signal on the clock line corresponding to the inverted information signal in the case of odd parity and to the non-inverted information signal in the case of even parity, the said switching being halted under the control of a block stop signal, with the result that bits which each time have the same parity can be produced as frame signals, the demodulator which is connected to a clock line and an information line comprising a four-bit-parity detector for recovering block start signals and block stop signals, a clock signal recovery unit adding a signal transition to a clock signal element under the control of a received block start signal, signal transitions received on an information line being suppressed by a suppressor under the control of a received block stop signal.

In addition to the comparatively simple construction and the increased flexibility as regards the apparatus connections, a particular advantage is the code transparency of the data; this transparency is unrestricted if the number of bits of an information block is even and the receiver can operate at any arbitrary rate up to the maximum transmission rate. The clock signal can be supplied by the control unit (in apparatus without local clock) as well as by the connected apparatus comprising a local clock. The information is not recoded.

The modulator preferably comprises a distributor having two outputs on which information clock pulse signals and frame clock pulse signals are alternately generated, and furthermore comprises a first logic circuit which is connected to an information input and which furthermore received the said information clock pulse signals and which forms the said bit pairs which are applied to an output mixing stage. Block start signals and block stop signals can thus be readily generated, whilst the construction of the bit pair generator is also simple.

The modulator preferably comprises a first logic circuit which receives information signals which are formed by a converter under the control of the control unit and also information clock pulses, first gate stages being connected in series to an output of said logic circuit, the said gate stages also being connected to an output of a first bistable element and an output of a second logic circuit, inputs of said first bistable element being connected to a clock input, inputs of the second logic circuit being connected to a clock input, to an output of the first bistable element, and to an output of a second bistable element, inputs of the second bistable element being connected to a clock input and to an information input, series connected second gate stages being connected parallel to said first gate stages, the first gate stage being connected to an information input, the outputs of the gate stage circuits being connected to a clock line and an information line. The modulator thus has a simple construction.

The demodulator preferably comprises a third logic circuit, inputs thereof being connected to a clock line and an information line, an outupt thereof being connected to an input of a third bistable element, a fifth logic circuit being provided, inputs thereof being connected to outputs of the third bistable element and to an information line. The demodulator thus also has a simple construction.

The modulator preferably comprises a fourth logic circuit, inputs thereof being connected to a clock line and an information line, to an output of said third bistable element and to an output of a fifth bistable element, a fourth bistable element being provided, inputs thereof being connected to outputs of said third bistable element and of said fourth logic circuit, inputs of said fifth bistable element being connected to outputs of the fourth logic circuit and the fourth bistable element. A very reliable operation is thus obtained.

The clock input preferably comprises a blocking element which can be unblocked for a given period of time under the control of a signal edge received by the demodulator and a clock.

The invention will be described hereinafter with reference to a number of figures.

Figure 1:
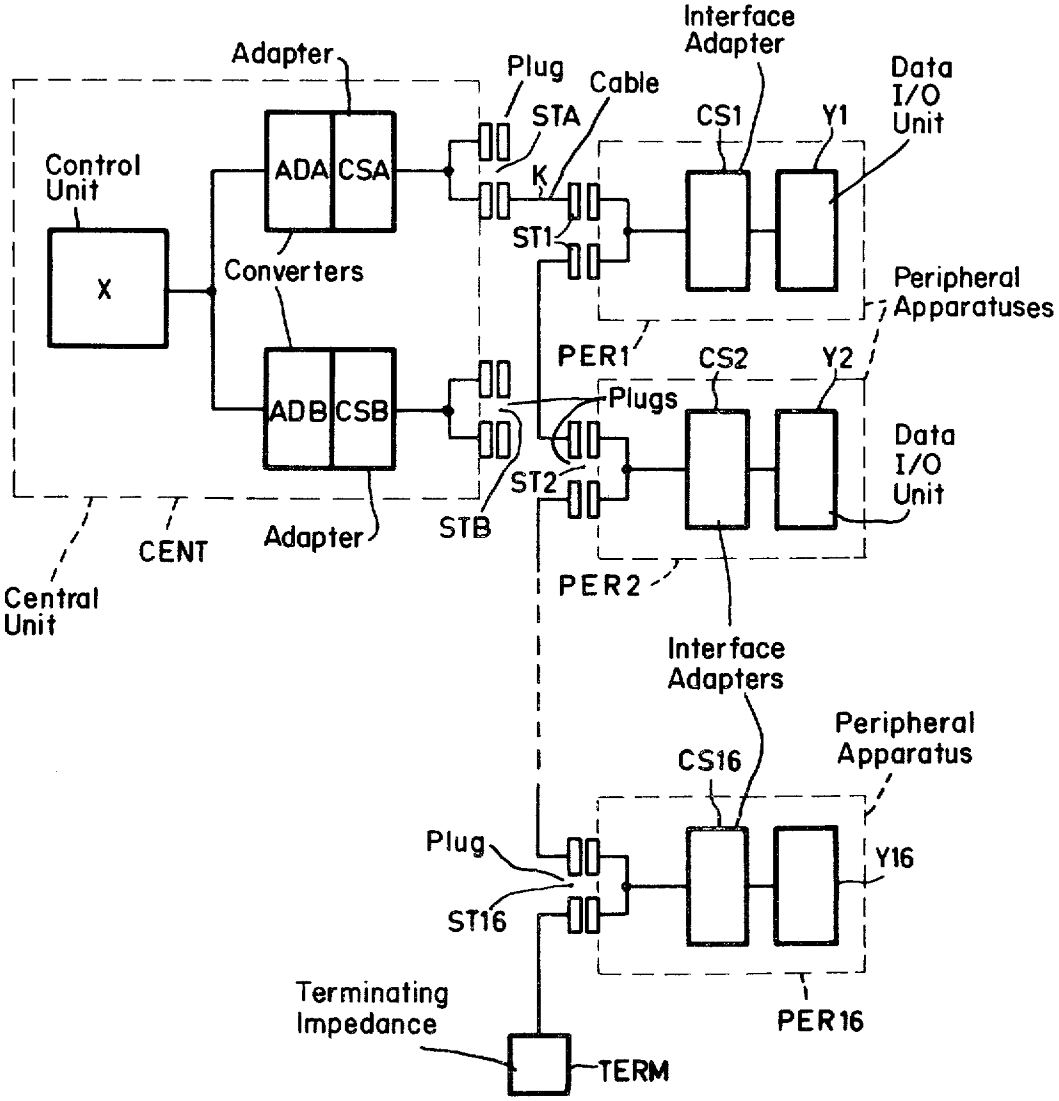
FIG. 1 shows a channel between a control unit and connected apparatus.

FIG. 1 shows the configuration of a channel with a central unit CENT, comprising a control unit X, two converters ADA, ADB, two serially operating adapters CSA, CSB and plug connections STA, STB. In this embodiment, 16 peripheral apparatus PER1...16 can be connected to the interface cable K. The peripheral apparatus PER1 comprises plug connections ST1, a serially operating interface adapter CS1 and the actual data input/output unit Y1. This actually concerns a BUS system: the cable K, which may be an ordinary telephone cable, can be fed from apparatus to apparatus as is shown. A STAR system can be considered as a BUS system in which only a single apparatus is connected. The free plug connection of the last apparatus is connected to a terminating impedance TERM.

In the central unit CENT a parallel interface adapter (not shown) is connected to the input of suitable converters ADA, ADB. This adapter can constitute the connection to the store of the control unit X. Parallel interface adapters are known per se. The converters ADA, ADB may be different, and they may even be omitted in given cases. The apparatus can alternatively operate serially. The information is transmitted, for example, in blocks. The connection to an apparatus PER1...16 is established and terminated under the control of command bits, and the apparatus signal back their status to the control unit X. In the case of an error in the transmission, the last block of information is repeated.

Figure 2A:
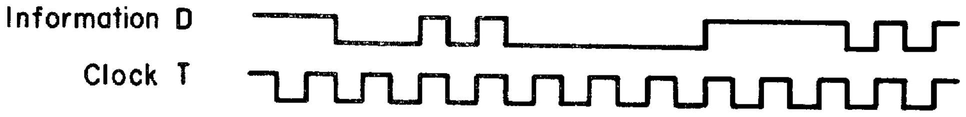
FIG. 2 illustrates the modulation by way of a pulse diagram.
Figure 2B:
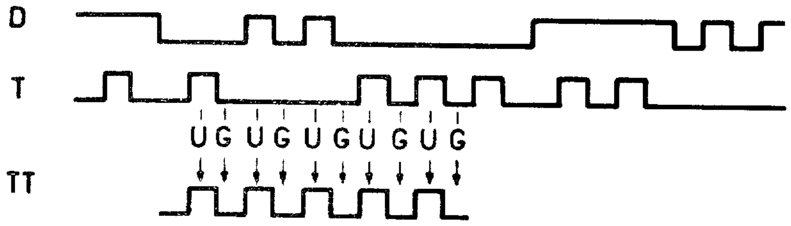

FIGS. 2A–D illustrate the modulation by way of a pulse diagram. In FIG. 2A, D denotes the information signals which can be formed according to a random code. T denotes the clock signals. If the logic state of the information signal also changes at the transition instants of the clock signal, the information signal can initiate a new clock pulse period. The clock signal is therefore modulated in accordance with FIG. 2B. Curve D is identical to that of FIG. 2A. Signal transitions can never occur simultaneously in the two curves of FIG. 2B. Whilst the original code of the information is maintained, very simple rules exist for recovery of the clock pulses from the signals D and T of FIG. 2B. This is because these signals alternately have an even (G) and an odd (U) parity with respect to each other. The clock signal (curve TT) can be readily recovered by means of a circuit of the exclusive-OR type.

Figure 2C:
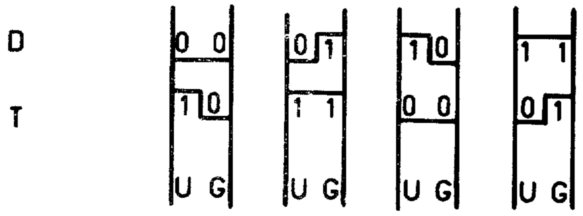

The modulation procedure is as shown in FIG. 2C: the information flow is subdivided into pairs of bits which are subsequently converted into the U-G pattern. There are $2^2 = 4$ different bit pairs. The clock pulse T is produced in the interval U by inversion of the information signal; in the interval G it is the same as the information signal.

Figure 2D:
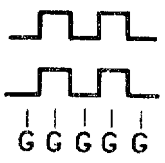

In this modulation mode, the intervals G never appear directly in succession. This sequence can be used, however, for transmitting information which is independent of any arbitrary information code and which indicates, for example, the end of a transparent information flow. The signal thus generated is referred to as "frame" and is shown in FIG. 2D.

Figure 3:
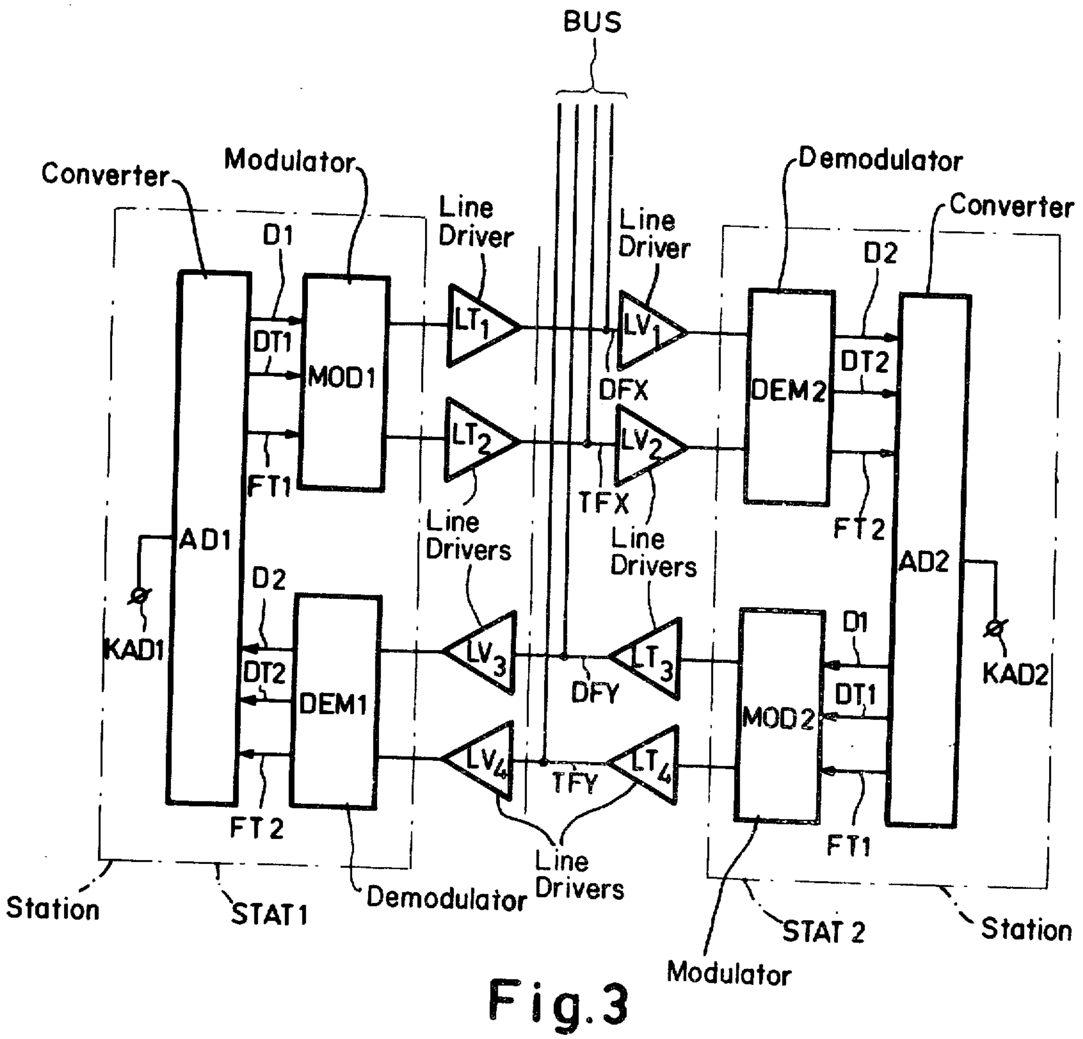
FIG. 3 shows a block diagram of a transport unit.

FIG. 3 shows a block diagram of a transport unit as an elaboration of a part of FIG. 1. Two stations STAT1,2 are provided, the identity of which is not further precisized. Each station comprises a modulator MOD1,2, a demodulator DEM1, 2 and a converter AD1, 2. Also present is a transport line BUS comprising two lines PFX/TFX and DFY/TFY for each transport direction, and line drive amplifiers LT1...4 and line receivers LV1...4. The converters can receive information signals and control signals or can transmit these signals to the terminals KAD1,2 which may be of a multiple construction.

Figure 4:
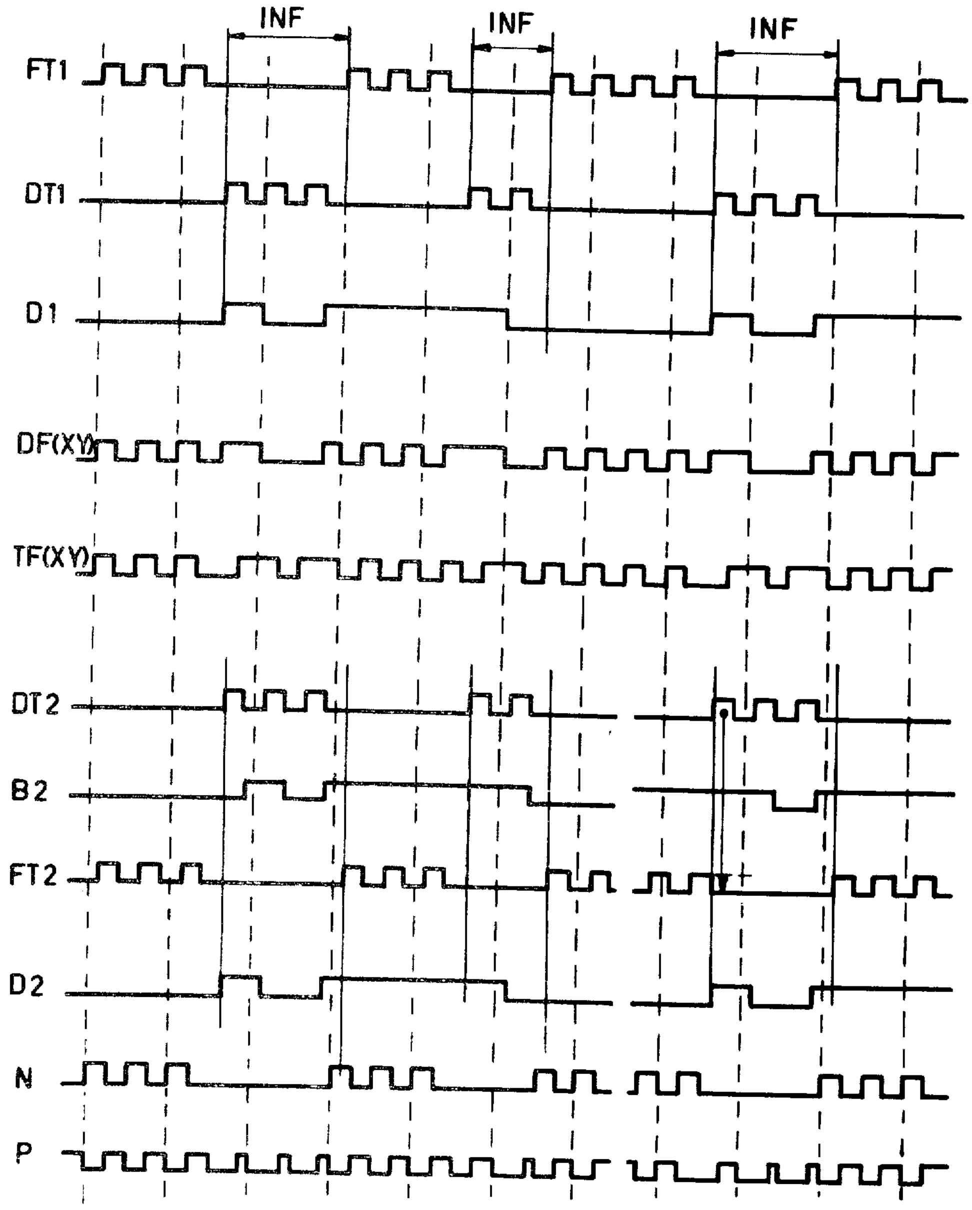
FIG. 4 shows pulse diagrams.

FIG. 4 shows pulse diagrams. A modulator, for example, MOD1, receives signals via three lines, i.e., frame clock pulses FT1, information clock pulses DT1, and information signals D1. The transitions between FT1 and DT1 produce block start signals and block stop signals. The reconstructed signals DT2, FT2 and D2 appear on the outputs of a demodulator, for example, DEM2. As soon as the modulator receives the signals DT1 and D1, it alternately generates signal elements which have an even and an odd parity between the two lines (DFX/TFX).

Figure 5:
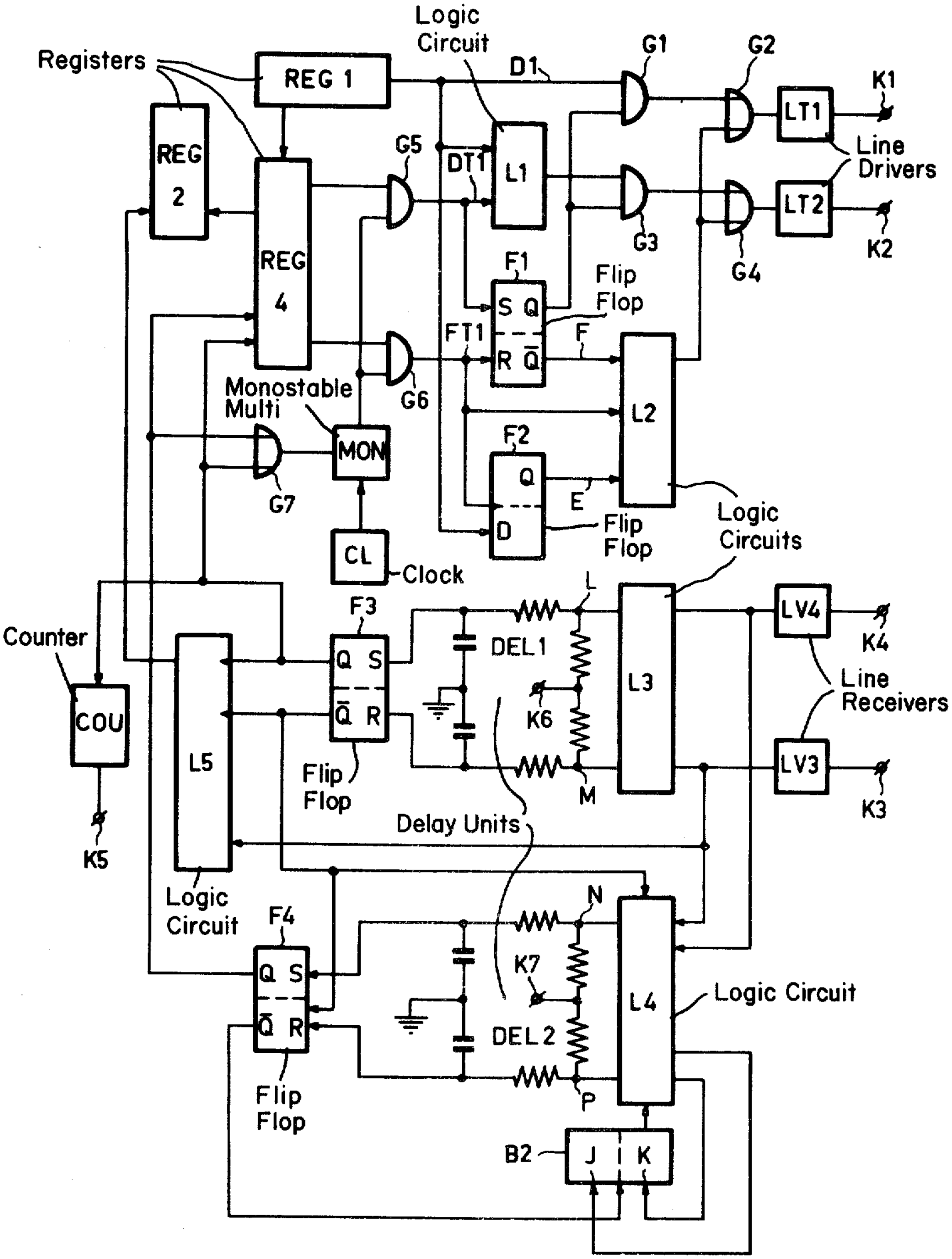
FIG. 5 shows a block diagram of a station.

FIG. 5 shows a block diagram of a station, comprising two line receivers LV3, 4, five logic circuits L1...5, five flipflops F1...4 and B2, four logic AND-gates G1,3,5,6, three logic OR-gates G2, 4, 7, three registersREG1, 2, 4, one counter COU, one clock CL, one monostable multivibrator MON, two delay units (RC-circuits) DEL 1,2, two line drive amplifiers LT1, 2, and seven signal terminals K1...7.

The register REG1 is an input register. This register can receive the information, for example, in parallel form, but this is not shown. The register REG4 decodes part of the information from the register REG1 and on the basis thereof it sets one of the two logic AND-gates G5, 6 to the logic 1 state, with the result that they allow passage of the signals of the clock CL which are allowed to pass by the monostable multivibrator MON. The operation of the element MON will be discussed hereinafter. Thus, either the gate G5 supplies the signals DT1 or the gate G6 supplies the signals FT1. After an information interval (INF in FIG. 4), the signal FT1 starts with a logic 1. As a result, the inverted output of the flipflop F1 continuously supplies a logic 1 signal (notation F = 1). In contrast with the other flipflops, F2 is a data flipflop. The state of the flipflop F2 is therefore maintained until the beginning of the next information interval because no further transitions occur in the signal D1 (output of the register REG1). The correct phase relationship between the signals on DT2 and FT2 is thus maintained.

From the input signals E, F and FT1 the logic circuit L2 forms the logic combination $F.(E.\overline{F.T1} + \overline{E}.FT1)$ which is applied to the terminals K1, 2 via the two logic OR-gates G2, 4 and the line drive amplifiers LT1, 2. Consequently, these signals can be in phase or in antiphase with the signals FT1. The generation of logic output signals from logic input signals by means of gates is known per se. Via the OR-gates G3, 4, the output signals of the logic circuit L2 reach the line drive amplifiers LT1, 2 which therefore supply corresponding signals on the terminals K1, 2.

At the beginning of an information interval, the signal DT1 starts with a logic 1, with the result that the state of the flipflop F1 is changed and its output Q becomes 1. The logic circuit L2, consequently, constantly supplies a logic 0. The logic AND-gates G1, 3, however, are now opened. The logic AND-gate 61 allows passage of the signal D1 without modification. The logic circuit L1 comprises an exclusive-OR-gate. It receives the signal DT1 from the logic AND-gate G5 and the signal D1 from the register REG1. It thus forms the combination $(DT1.\overline{D1} + \overline{DT1}.D1)$. The output signals of the gates G1 and G3 reach, as previously described, the terminals K1,2. The signals formed are shown in FIG. 4 as the curves DF (X,Y) and TF (X,Y).

On the receive side, these signals are received, via the terminals K3,4, on line receivers L3,4 and are applied to the logic circuit L3 which forms two logic signals therefrom:

$$L = DF.\overline{TF} + \overline{DF}.TF = DT$$

$$M = DF.TF + \overline{DF}.\overline{TF} = \overline{DT}$$

These two combinations are thus formed by an exclusive-OR-circuit and a known coincidence circuit respectively. During transmission of information, the output signals regularly alternate between 1 and 0, thus forming the inverted or non-inverted information clock pulses. The delay element DEL1 comprises two parallel connected RC-elements. These elements act as a low-pass filter. The terminal K6 can be connected to an energy source. The delay time of DEL1 amounts to one half bit length. Other delay elements are alternatively usable. During the transmission of frame clock pulses, the signal on line M is always 1. The signals on the lines L and M control the flipflop F3 (SR-flip-flop). The non-inverted output Q of the flipflop F3 is connected to an input of the logic circuit L5 and to the logic OR-gate G7 and the register REG4. The inverted output $\overline{Q}$ of the flipflop F3 is connected to an input of the logic circuit L5, to a reset input of the flip-flop F4 and to the logic circuit L4.

The logic circuit L4 receives the output signals of the line receivers LV3, 4: DF and TF. Therefrom, a signal $\overline{DF}.\overline{TF}$ (AND-gate) is formed which is applied to the J-input of the flipflop B2. Also formed is a signal DF. TF (NOR-gate) which is applied to the K-input of the JK-flipflop B2. Furthermore, the logic circuit L4 receives the output signal of the flipflop B2. Therefrom, the following logic signals are formed on the lines N and P:

$$N = \overline{DT2}\ (B2.\overline{DF}.\overline{TF} + \overline{B2}.DF.TF)$$

$$P = (B2.DF.TF + \overline{B2}.\overline{DF}.\overline{TF})$$

The signal $\overline{DT2}$ of the output $\overline{Q}$ of flipflop F3 is delayed over one half bit length by the delay element DEL1. The delay elements DEL1 and DEL2 have a similar construction. An energy source can be connected to terminalK7. The signals on the lines N, P control the flipflop F4. The non-inverted output of F4 supplies the signal FT2 and is connected to the logic OR-gate G7 and to an input of the register REG4. The inverted output of the flipflop F4 supplies the signal $\overline{FT2}$ and is connected to the clock pulse input of the JK-flipflop B2.

FIG. 4 shows three intervals INF in which data are transmitted. These intervals alternate with frame intervals. Each information interval terminates with the signal combination 0/0 or 1/1 on the line DFX and TFX which are connected to the terminals K3, 4. The next frame interval then starts with the code 1/1 or 0/0, respectively. The output signal of the flipflop B2 depends on the code of the last information bit received. $\overline{FT2}$ is always 1 during an information interval, with the result that the state of B2 is always adapted to the even information bits. During a frame interval, the state of B2 remains unchanged. The signal on FT2 is derived, as indicated, from the codes 0/0 or 1/1 on the lines DFX/TFX. The state of the flipflop B2 determines the correct phase relationship between the signals on FT2 and those on DT2.

The last information interval in FIG. 4 is different: it is assumed that flipflop B2 is in the wrong state due to a defect or because the relevent apparatus was switched on only in the frame interval just before the relevant information interval. In that case no information is present about the history on the lines DFX, TFX. The first signal DT2 has a synchronizing effect and directly produces the correct phase relationship (arrow in FIG. 4).

The clock pulses generated by the demodulator are delayed over approximately one half bit length by the delay elements DEL1,2. Distortions and differences in delay times between the signals on the lines DFX and TFX, for example, as a result of different switching times in the line drive circuits and line receivers, are thus suppressed. Interference signals are also suppressed to a substantial defree. The logic circuit L5 not only receives the delayed clock pulses DT2, $\overline{DT2}$, but also the signal DFX from terminal K3. The edges of the delayed clock pulses occur in the centre of the bits of the signal DFX. These edges interrogate the signal DFX and the result is stored in a bistable circuit. Consequently, on the output of L5 the information signal D2 is present, and this signal is applied to a register REG2.

Using this method, the information transport is effected without errors if the parity states of the signals on the two lines alternate regularly with the clock pulse. A disturbance in this regularity, for example, caused by an excessive delay time difference between the two signals, can be detected as follows. First of all, the frame clock pulses can be recovered within an information interval: the transmission is directly interrupted in reaction thereto. Furthermore, an information clock pulse to be recovered can be omitted. However, such pulses reach the counter COU via the noninverted output Q of the flipflop F3. This counter can be constructed as a ring counter. If the number of bits of each block of information equals the number of stages of the ring counter, the counter will always be in the same position at the end of an information block. If this is not so, an error signal can appear on the terminal K5.

Figure 6:
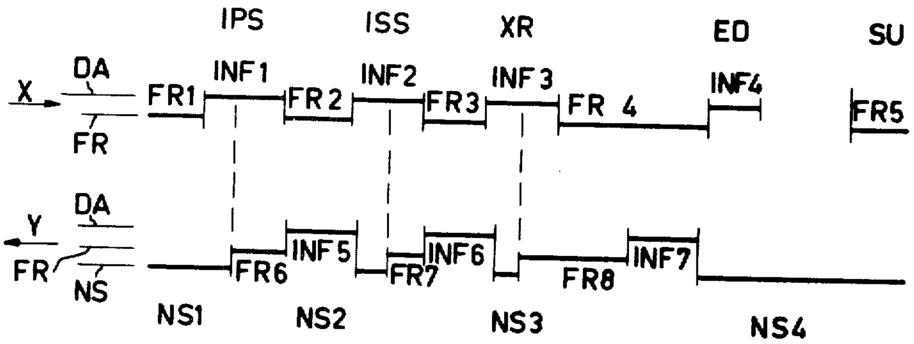
FIG. 6 shows a diagram of an interrogation procedure.

FIG. 6 shows a feasible interrogation procedure of an apparatus. On the X-line (for example, DFX/TFX) two levels (DA, FR) are indicated, i.e., information intervals INF1...4 and frame intervals FR1...5. On the Y-line (for example, DFY/TFY) three levels (DA, FR, NS) are indicated, i.e., information intervals INF5...7, frame intervals FR6...8, and rest intervals NS1...4. Given by way of example are the commands IPS (interrogation of the primary status) ISS (interrogation of a secondary status), XR (selective resetting), ED (end of the block transmission with confirmation), SU (end of the block transmission without confirmation). These commands do not effect information transport. The selected apparatus reacts thereto by signalling back its primary status. A command is encoded, for example, in the eight information bits which directly succeed the last frame bit. The first four bits contain the address of the apparatus (PER1...16 of FIG. 1). The next four bits contain a command code. The status is encoded in the eight bits directly succeeding the last frame bit.

According to FIG. 6, the control unit X alternately transmits, provided it is ready for operation, frame bits or information bits at the maximum transport rate of the channel. If (see after the signal ED) on a line a rest state is present for some time, for example, 100 ms, X is not ready for operation. This information can also reset the apparatus PER1...16.

The lines of Y are in the non-selected state at the beginning because all apparatus have switched off their line drive units. However, all apparatus receive the signals on the lines from X.

If an apparatus recognizes its own address, it switches on its line drive unit and transmits frame bits to X. X has previously activated its two line receivers which are connected to the lines DFY/TFY. As long as none of the apparatus is activated, the lines DFY/TFY are in the non-selected state NS. Interference signals may then be present thereon. By using suitable threshold circuits on the input of the line receivers in the control unit X so that each information which is transmitted by a selected apparatus Y starts with a fixed sequence of signals, for example, with four frame bits, sufficient protection can be achieved against incorrect selection of apparatus.

In the case of a two-bit verification mechanism, the receiver must supply a corresponding set of two bits after a transmitter has transmitted two bits. The transmitter may supply a next pair of bits only after this has taken place. This is achieved in the circuit shown in FIG. 5 by means of the monostable multivibrator MON. Via the logic OR-gate G7, this multivibrator receives signals from the flipflop F3 (DT) and from the flipflop F4 (FT), with the result that the monostable multivibrator is set for a fixed period of time; this is effected under the control of the clock CL. As a result, one of the two gates G5, 6 allows passage of two bits which are further utilized as information clock pulses or frame clock pulses.

In order to achieve an isochronous pulse flow, the pulse returned by the receiver must arrive in the transmitter within the duration of the transmitted pair of bits. In the case of a maximum required transport rate and given delay times of amplifiers and demodulators, the maximum length of the lines is governed by the specific delay time therein. In the case of substantial length, an anisochronous pulse flow is obtained, with the result that the transport rate is reduced. For a given length of the lines, the transport rate can be increased by utilizing a verification mechanism which waits for the verification by the other station after the transmission of two or more pairs of bits. After having been received, information bits are temporarily stored in the register REG2. They can alternatively be used for further controlling the register REG4.

Figure 7:
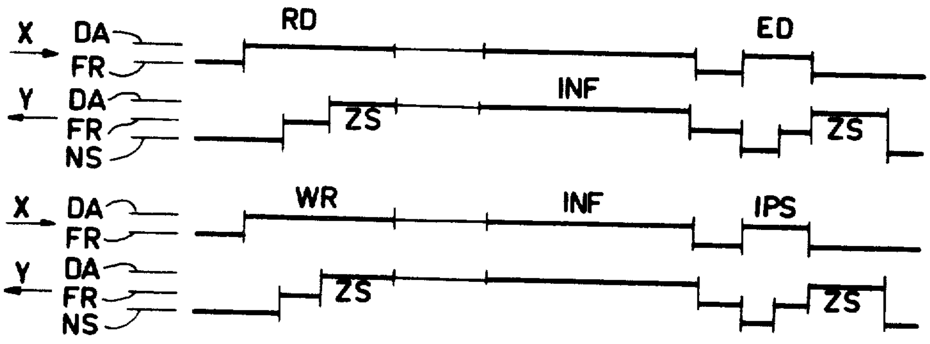
FIG. 7 shows a diagram of a feasible procedure for giving a command.

Commands which initiates an information transport, for example, "read" or "write," start like all other commands (FIG. 7). The upper and the lower half of the Figure each relate to one of the stations in communication. Both the control unit X and the apparatus Y, however, remain selected after the transport of the command signal (RD or WR) and status signal (ZS). This means that the control unit must transmit a number of successive 1 bits after the command signal so as to maintain the verification mechanism for the status transport and the information transport.

After the status of the apparatus has been received, a waiting time can start in the control unit X as well as in the apparatus Y; however, this waiting time must be smaller than the time (for example, 100 ms) which characterizes the non-ready state of the control unit X. Such a waiting time can also occur in the information interval at any location if this is required by internal occurrences in the control unit X or the apparatus Y.

Both stations can terminate the transport by transmitting frame bits, thus indicating at the same time that the next information given by X represents a command, and that given by Y represents a status.

The code transparency of the information flow starts after the status information has been transported, i.e., after the eighth information bit in both directions after frame bits. It terminates as soon as one of the stations involved transmits or receives frame bits.

Other embodiments are also feasible within the scope of the invention. In particular, the parities of the signals may be different. For example, it is feasible that exclusively odd parities are generated during frame intervals. The realization in circuit elements can alternatively be different.

What is claimed is:

1. A serially-operating interface adapter for data input and output apparatus, comprising a modulator, a demodulator and a transport line via which blocks of information and clock signals can be transported, furthermore comprising a control unit which is connected to the transport conduit and which generates connect command signals and receives status signals, said transport conduit comprising a pair of lines consisting of a clock line and an information line, said modulator including means for generating bit pairs of signal elements having an even and an odd state, said pairs of signal elements being of alternating parity and being generated on a clock line and an information line respectively, said generating means being connected to clock inputs and information inputs activated under the control of a block start signal from said control unit, said generating means also being switchable between said states under the control of clock signals, said signal on the clock line corresponding to the inverted information signal in the case of odd parity and to the non-inverted information signal in the case of even parity means for halting, said switching under the control of a block stop signal, bits on different lines and occurring at the same time having the same parity being produced as frame signals, the demodulator which is connected to a clock line and an information line comprising a four-bit-parity detector for recovering block start signals and block stop signals.

2. A serially-operating interface adapter as claimed in claim 1, wherein the modulator comprises a distributor having two outputs on which information clock pulse signals and frame clock pulse signals are alternately generated, and furthermore comprises a first logic circuit which is connected to an information input and which furthermore receives said information clock pulse signals and which forms the said bit pairs.

3. A serially-operating interface adapter as claimed in claim 1, wherein the modulator comprises a first logic circuit which receives information signals which are formed by a converter under the control of the control unit and also information clock pulses and includes first gate stages being connected in series to an output of said logic circuit, a first and second bistable element and a second logic circuit being included, said gate stages also being connected to an output of said first bistable element and an output of said second logic circuit, inputs of said first bistable element being connected to a clock input, inputs of the second logic circuit being connected to a clock input, to an output of the first bistable element, and to an output of a second bistable element, inputs of the second bistable element being connected to a clock input and to an information input, series connected second gate stages also being included which are connected parallel to said first gate stages, the first of said second gate stages being connected to an information input, the outputs of the second of each of said first and second gate stage circuits being connected to aclock line and an information line.

4. A serially-operating interface adapter as claimed in claim 3, wherein the demodulator comprises a third logic circuit, a third bistable element and a fifth logic circuit, inputs of the third logic circuit being connected to a clock line and an information line, an output thereof being connected to an input of said third bistable element, said fifth logic circuit having inputs thereof being connected to outputs of the third bistable element and to an information line.

5. A serially-operating interface adapter as claimed in claim 4, wherein the modulator comprises a fourth logic circuit and fourth and fifth bistable elements, inputs thereof being connected to a clock line and an information line, to an output of said third bistable element and to an output of said fifth bistable element, said fourth bistable element having inputs thereof being connected to outputs of said third bistable element and of said fourth logic circuit, inputs of said fifth bistable element being connected to outputs of the fourth logic circuit and the fourth bistable element.

6. A serially-operating interface adapter as claimed in claim 1, wherein the clock input comprises a blocking element capable of being unblocked for a given period of time under the control of a signal edge received by the demodulator and a clock.

7. The interface adapter of claim 1 wherein said demodulator including a clock signal recovery unit which adds a signal transition, to a clock signal element under control of a block start signal, and also including a suppressor and wherein signal transitions received on an information line are suppressed by said suppressor under the control of a block stop signal.

* * * * *

UNITED STATES PATENT OFFICE

CERTIFICATE OF CORRECTION

Patent No. 3,889,236 Dated June 10, 1975

Inventor(s) HORST HERGER ET AL

It is certified that error appears in the above-identified patent and that said Letters Patent are hereby corrected as shown below:

Column 1, line 3, change "serially operating" to --serially-operating--, line 55, change "serially operating" to --serially-operating--.

Column 3, line 30, change "serially operating" to --serially-operating--, lines 34-35, change "seriallyoperating" to --serially-operating--.

Column 4, line 27, change "PFX/TFX" to --DFX/TFX--, line 57, change "l" to --"1"--, line 64, change "l" to --"1"--.

Column 5, line 18, change "l" to --"1"--, line 20, change "l" to --"1"--, line 21, change "O" to --"0"--, line 40, change "l" to --"1"-- and change "O" to --"0"--, line 48, change "l" to --"1"--.

UNITED STATES PATENT AND TRADEMARK OFFICE

CERTIFICATE OF CORRECTION

PATENT NO. : 3,889,236

DATED : June 10, 1975

INVENTOR(S) : HORST HERGER ET AL

It is certified that error appears in the above-identified patent and that said Letters Patent are hereby corrected as shown below:

Column 6, line 20, change "l" to --"1"--.

Column 8, line 18, change "l bits" to --"1"-bits--.

Signed and Sealed this

*twenty-fifth* Day of *May 1976*

[SEAL]

*Attest:*

RUTH C. MASON
*Attesting Officer*

C. MARSHALL DANN
*Commissioner of Patents and Trademarks*